United States Patent
Schuetz (10) Patent No.: US 10,208,525 B2
(45) Date of Patent: Feb. 19, 2019

(54) ASSEMBLY FOR A VEHICLE

(71) Applicant: Heiko Schuetz, Velbert (DE)

(72) Inventor: Heiko Schuetz, Velbert (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 410 days.

(21) Appl. No.: 15/016,780

(22) Filed: Feb. 5, 2016

(65) Prior Publication Data

US 2016/0245011 A1    Aug. 25, 2016

(30) Foreign Application Priority Data

Feb. 19, 2015    (DE) .................. 10 2015 102 386
Feb. 25, 2015    (DE) .................. 10 2015 102 726

(51) Int. Cl.

| H04N 5/77 | (2006.01) |
|---|---|
| B60R 11/00 | (2006.01) |
| B60R 11/04 | (2006.01) |
| E05F 15/73 | (2015.01) |
| H04N 5/225 | (2006.01) |

(52) U.S. Cl.
CPC .............. *E05F 15/73* (2015.01); *B60R 11/04* (2013.01); *H04N 5/2251* (2013.01); *H04N 5/2252* (2013.01); *H04N 5/77* (2013.01); *B60R 2011/004* (2013.01); *B60R 2011/0094* (2013.01); *E05F 2015/767* (2015.01); *E05Y 2600/11* (2013.01); *E05Y 2900/532* (2013.01)

(58) Field of Classification Search
None
See application file for complete search history.

(56) References Cited

U.S. PATENT DOCUMENTS

2014/0197649 A1*   7/2014   Hansen .................. B60R 11/04
                                                                 292/336.3
2016/0219204 A1*   7/2016   Nickel ................. H04N 5/2251

FOREIGN PATENT DOCUMENTS

DE        10 2006 039 192 A1    2/2008
WO     WO 2013/029718 A1 *   2/2013   ............... E05C 3/16

* cited by examiner

*Primary Examiner* — Dakshesh D Parikh
(74) *Attorney, Agent, or Firm* — Fay Sharpe LLP (57) ABSTRACT

An assembly for a vehicle having a supporting housing includes a drive unit, a moveably supported camera unit for recording a surrounding area of the vehicle, an actuation element, a mechanical return element, and a support element, which is coupled to the mechanical return element, wherein the mechanical return element exerts a return force that retains the actuation element in the standby position, or forces the actuation element into the standby position when the camera unit is in the standby position. The return element is supported on the support element. An assembly is thus created in structurally simple manner, which is distinguished by a small installation space, and which can be operated in an energy efficient manner. The support element can be moved in relation to the supporting housing. Also, the drive unit is coupled to the support element.

14 Claims, 5 Drawing Sheets

ASSEMBLY FOR A VEHICLE

BACKGROUND

The invention relates to an assembly for a vehicle, in particular for a rear hatch or tailgate of a vehicle, having a supporting housing, which is to be disposed in an opening in an outer shell of the vehicle. The assembly includes a drive unit, which is attached to the supporting housing, a movably supported camera unit, which is accommodated on the supporting housing and is coupled to the drive unit, in order to be moved between at least a standby position and an active position, in which the surrounding area of the vehicle can be recorded, an actuation element supported on the supporting housing, which is designed such that it can be moved between a standby position that covers the camera unit and an open position, and which is suited for unlocking and/or opening the rear hatch, a mechanical return element, which is coupled to the actuation element, and a support element, which is coupled to the mechanical return element, wherein the mechanical return element exerts a return force that retains or forces the actuation element in the standby position, and is supported on the support element when the camera unit is in the standby position.

This assembly has a two-fold function, in that it is designed to open a door, tailgate or hatch of the vehicle, on one hand, for which the actuation element is provided, which is supported on the supporting housing. On the other hand, the assembly also serves to record images of the surrounding area of the vehicle, as is essential for a safe parking in reverse. This is because the rearview mirrors only provide the vehicle driver with an insufficient observation range, because the rearview mirrors do not allow for a view of the so-called blind spot. By means of a camera unit, images can also be displayed on a screen disposed inside the vehicle, of regions that cannot be viewed by the vehicle driver with the rearview mirrors, such that the vehicle driver has a nearly complete overview of the surrounding area into which the vehicle is to move when parking in reverse.

Assemblies of this type comprise a supporting housing, in which the camera unit is accommodated such that it can move between a retracted standby position and an active position. By way of example, camera units of this type are used, as mentioned above, in the field of parking assistance for vehicles. If, for example, the vehicle is shifted into reverse, the camera unit is moved from the standby position into the active position. As a result, images of the surrounding area behind the vehicle are recorded and displayed on a display screen for the driver. If the parking in reverse is completed, and the driver shifts out of the reverse gear, the camera can be moved from the active position back into the standby position.

An assembly of the type referred to in the introduction and described above is known, for example, from DE 10 2006 039 192 A1, and comprises an actuation element designed to open a door or hatch, and a camera unit, which is designed to record images of the exterior region of a vehicle. The actuation element is coupled to a mechanical return element in this assembly. The return element applies a return force to the actuation element, by means of which the actuation element is retained or forced in its standby position. The actuation element thus moves automatically back into its standby position with the aid of the return element, in which position it covers the camera unit. In addition to the effect of the automatic return, an undesired rattling of the actuation element while driving is prevented by the return force of the return element. With this known prior art, the actuation element is moved from its standby position into its actuation position with the aid of the camera unit or the drive unit, in that, when the camera unit is moved form the standby position into the active position, the actuation element is simultaneously displaced. The drive unit must therefore be capable of exerting a greater force than the return force, in order to be able to move the actuation element out of its standby position. It should be noted thereby that, due to the function of the actuation element serving to open, the return force cannot only be dimensioned for preventing the rattling noise. On the contrary, is it necessary, for safety reasons, to select the return force to be great enough that the actuation element is retained in the standby position, and does not move unintentionally into the open position, even in the case of high centrifugal forces, which may prevail, for example, in the event of a vehicle accident, in which position it unlocks a door or hatch of the vehicle, or can even open said door or hatch. The drive unit must work against this high return force, such that for an assembly of this type, a large and powerful drive unit is necessary. This is accompanied, however, with the disadvantage that a drive unit of this type requires a relatively large installation space, and also has a high power consumption, for moving the camera unit from its standby position, against the return force that acts on the actuation element, into the active position.

The invention addresses the object of creating a solution that creates an assembly for a vehicle in a structurally simple manner, which can be produced inexpensively, and with which the disadvantages specified above are eliminated. In particular, an assembly should be provided, which is distinguished by a small installation space, and which can be powered with low energy, or which can be operated in an energy efficient manner.

BRIEF SUMMARY

With an assembly of the type specified in the introduction, the object is achieved in according with the invention in that the support element can be moved in relation to the supporting housing, and in that the drive unit is coupled to the support element.

For the invention, the term "coupled" or "coupling" is to be understood to mean a functional connection, by means of which, for example, the drive unit causes a movement of the support element, directly, or indirectly via another component, wherein the functional connection can be mechanical or electrical.

Advantageous and functional designs and further developments of the invention can be derived from the dependent claims.

An assembly is provided for a vehicle by the invention, which is distinguished by a functional construction. An assembly of this type for a vehicle, having a moveably supported camera unit and an actuation element for opening and/or unlocking a door or a hatch of the vehicle has a simple and inexpensive design, and ensures a secure protection of the camera unit from environmental effects, when the actuation element is in the standby position, such as dirt, impacts or shocks, wherein an unintentional opening of the actuation element due to centrifugal forces, which act on the actuation element in the event of a vehicle accident, is also effectively prevented by the invention. The assembly according to the invention has a two-fold function, specifically the recording of the vehicle surrounding area and the opening and/or unlocking of a hatch or door of the vehicle, for which reason the assembly can alternatively also be referred to as a recording/actuation assembly, or as a camera unit with an integrated actuation element, or as an actuation or handle assembly with an integrated camera unit. Because the drive unit is coupled to the support element, and the support element is designed such that it can be moved in relation to the supporting housing, the support element is displaced when the drive unit moves the camera unit from the standby position into the active position. Due to this displacement of the support element relative to the supporting housing, the position of the support element is also displaced in relation to the actuation element supported on the supporting housing, which then results in a change to the effect of the return force of the return element, because the support of the return element changes due to the displacement of the support element. It is known from the prior art that the return element is supported on the supporting housing. In differing from the prior art, however, this support, specifically, which is provided by the support element, can be locally modified, because the support element can change its position in relation to the supporting housing and depending on the position of the camera unit or the operating mode of the drive unit. In accordance with the invention, a changing of the position of the support element when the camera unit is moved from the standby position into the active position enables it to also simultaneously move the actuation element into its open position, without this movement having to be executed against the return force. This is because, since the support element is disposed in a position, when the camera unit is in the active position, that is different from the position it is in when the camera unit is in the standby position, the support for the return element also changes, which in turn results in the actuation element being moved from its standby position into its open position without power, and accordingly, without a substantial supplementary expenditure of force, when the camera unit is moved from the standby position into the active position by the drive unit. In this context, without power means that with the aforementioned movement of the actuation element, the return force does not need to be overcome. The drive unit must thus only use the amount of force that is required for the displacement of the camera unit and the support element. The return force must then only be overcome when the camera unit is disposed in its standby position, and the actuation element is actuated by a user in order to unlock and/or open the rear hatch.

In the design of the assembly, the invention provides that the actuation element can be moved into the open position, counter to the return force exerted by the return element, when the camera unit is in the standby position, which actuation element is designed to unlock and/or open the rear hatch. This has the advantage that the actuation element automatically returns to the standby position when the manual actuation of the actuation element is completed. Thus, no additional or larger drive unit is required for the return, such that neither installation space nor additional energy need be obtained for a supplementary drive.

In order to modify the efficacy of the return force of the return element, the invention provides in its design that the support element is designed such that it can be moved between an initial position, in which the camera unit is disposed in the standby position, and an operating position, in which the camera is disposed in the active position. The coupling of the various positions of the support element to the two camera positions has the advantage that the support element is coupled to the drive unit by this means. It is possible, with the aid of the drive unit, to which the support element is coupled, to move the support element in relation to the supporting housing. As a result, a movement of the camera unit caused by the drive unit can be connected to a movement of the support element, wherein a change in the placement of the support element with respect to the supporting housing results in a change in the relative placement of the support element in relation to the actuation element, which in turn causes a change in the efficacy of the return force. The return force, by means of which the actuation element is forced into the standby position, is only effective when the support element is disposed in the standby position.

A structurally particularly practical possibility for implementing an effective return force is provided in another design of the invention in that the mechanical return element comprises an elastic spring element. The elastic spring element is compressed when the actuation element is actuated, by means of which the return force becomes effective, which engages with the actuation element and forces it into the standby position.

When the camera unit is not disposed in the active position, and the un-actuated actuation element covers the camera unit in the standby position, it is provided in another design of the embodiment that, when the support element is in the initial position and the actuation element is in the standby position, the spring element is relaxed, or at a pre-tension that retains the actuation element in its standby position. The spring element is then not subjected to a bending, when it is relaxed, when the actuation element is disposed in the standby position, and the camera unit is disposed in the standby position, wherein, however, other means of acting on the spring element are possible. Alternatively, the spring element can also be subjected to a pre-tensioning, by means of which the actuation element is prevented from being able to move when it is positioned in its standby position and generate rattling noises.

In a further design of the assembly according to the invention, it is provided that the support element is retained in the initial position when the camera is in the standby position, such that the spring element is elastically compressed when the actuation element is in the open position, as a result of a relative displacement of the actuation element in relation to the support element. The spring element is compressed, accordingly, when the actuation element is actuated in order to unlock and/or open a door or rear hatch, in that a force is applied, acting against the return force of the spring element, which, in particular, is greater than the return force.

In order to minimize the necessary installation space, it is advantageous in a further design of the invention when the support element is pivotably supported on the supporting housing, wherein the support element is retained in the initial position by a retaining force, which is greater than the return force of the elastic spring element. A retaining force, which is greater than the return force, is necessary in order for the support element to continue to possess its supporting effect when the actuation element is actuated, and is not forced out of its initial position by the return element. The necessary retaining force can be applied thereby by the drive unit, which can function as a type of engine brake, when the camera unit is disposed in its standby position, and need not be moved.

The measure, in which the support element can pivot about an axle supported on the supporting housing, wherein the support element also has a first lever arm, on which a bearing surface for the elastic spring element and a movement pin interacting with a movement path formed on the actuation element are formed, likewise contributes to space saving. When the support element is disposed in the initial position, it provides a bearing surface on which the return element is supported, which is pressed against the support element by the actuation element when the actuation element is actuated by a user. When, on the other hand, the support element is moved out of the initial position into the operating position, then the movement pin of the support element pulls the actuation element into its open position, without compressing the spring element thereby, or having to work against the return force, because the bearing surface for the return element moves together with the support element.

For a securely executed movement, it is advantageous when the elastic spring element forces the movement pin into the movement path. A movement of the actuation element or the support element thus occurs in a controlled manner.

In order to change the position of the support element, the design of the invention provides that the first lever arm of the support element, or a second lever arm of the support element, is moveably coupled to the drive unit, wherein the support element is preferably moveably coupled to the drive unit via the camera unit. As a result, only one single drive unit is needed in order to move the camera as well as to pivot the actuation element. Because the pivoting of the actuation element from the standby position into the open position occurs substantially without power, or because it is not necessary to work against the return force of the return element, respectively, it is possible to employ a drive unit having less drive power, which is both economical and requires less installation space.

The design of the invention also provides that the actuation element can be pivoted about a pivotal axle supported on the supporting housing between the standby position and the open position, wherein, when moved into the operating position, the movement pin bears on an end point or an end surface of the movement path of the support element, such that the movement pin of the support element, when the support element is moved from the initial position into the operating position, pulls the actuation element into its open position. This pulling is also referred to a powerless entrainment, as set forth in the invention, because the drive unit does not need to exert any noticeable additional force in order to pivot the actuation element into the open position, because, in accordance with the invention, it is not necessary to work against the return force of the return element, due to the change in position of the support element. It should be noted thereby that, despite the powerless entrainment of the spring element, the movement pin always presses into the movement path.

In order for the assembly to be able to be installed in the vehicle in the most space saving manner, it is of substantial advantage when the pivotal axle is also the axle that supports the support element. In this manner, the installation space for an additional axle can be eliminated.

The entrainment of the actuation element with the aid of the support element occurs—as noted above—substantially without power. For this purpose, the invention provides in its design that with a movement of the camera unit from the standby position into the active position, the relative location, or position, of the bearing surface of the first lever arm in relation to the actuation element does not change, such that the spring element is relaxed, both during the movement of the camera unit from the standby position into the active position as well as in the operating position of the support element and in the open position of the actuation element, or is in a pre-tension that retains the relative position of the bearing surface in relation to the actuation element.

Lastly, in a further development, the invention provides that the second lever arm is designed as a flap element, which covers the camera unit when the support element is in the initial position, and which is pivotally disposed about the pivot axle when the support element is in the operating position, such that the camera unit can be moved into the active position, in order to record a surrounding area of the vehicle. The actuation element then covers the camera unit when it is not actuated and is in its standby position. There is, however, the danger when actuating that, when the actuation element is pivoted upward, dirt and suchlike may soil the camera unit, such that the camera unit is unable to fulfill its duty of recording images of the surrounding area of the vehicle. This danger is avoided with a supplementary flap element, which is then only pivoted when the camera unit is moved from its standby position into the active position.

It is to be understood that the features specified above and to be explained below may be used in not only the respective given combination, but also in other combinations or in and of themselves, without abandoning the scope of the present invention. The scope of the present invention is only defined by the Claims.

BRIEF DESCRIPTION OF THE DRAWINGS

Further details, features and advantages of the subject matter of the invention can be derived from the following description in conjunction with the drawings, in which a preferred exemplary embodiment of the invention is depicted by way of example. Therein.

DETAILED DESCRIPTION

Figure 1:
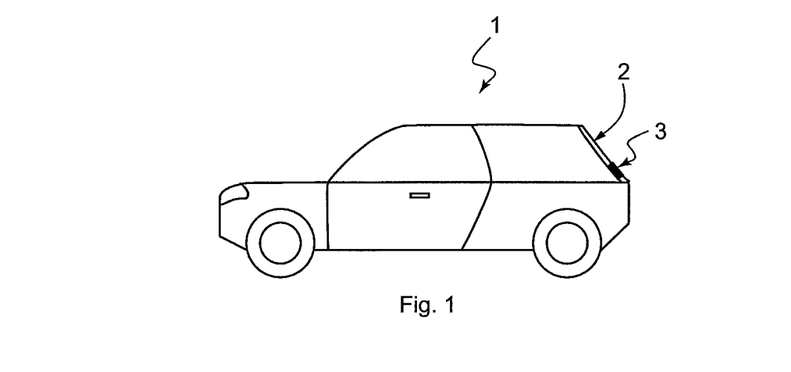
FIG. 1 shows a side view of a motor vehicle with an assembly according to the invention.
Figure 2:
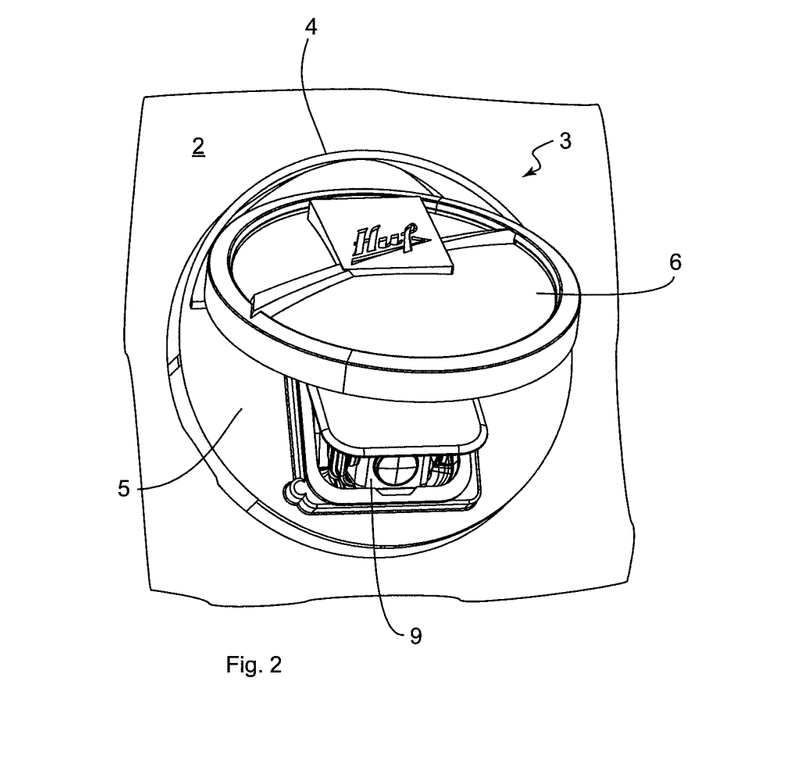
FIG. 2 shows a perspective view of the assembly, of which a supporting housing is disposed in an opening in the outer shell of the vehicle, and in which an actuation element is in an open position.

A vehicle in the form of a passenger automobile is depicted by way of example in FIG. 1, which has a hatch, or rear hatch, respectively, in the example, on which the assembly 3 is attached in accordance with the invention. The assembly 3 according to the invention has a two-fold function, specifically the recording of the vehicle surrounding area, and the opening and/or unlocking of the hatch 2, for which reason the assembly can also be referred to as a recording/actuating assembly, or as a camera unit with an integrated actuation element, or as an actuation or handle assembly with an integrated camera unit. The assembly 3 is placed in an opening 4 in the outer shell of the vehicle 1, and secured there, as is shown, in particular, in FIG. 2. A perspective exploded view can be seen in FIG. 3, in which the individual components of the assembly 3 are illustrated. The assembly 3 comprises a supporting housing 5, on which an actuation element 6 is supported, which is designed such that it can be moved between a standby position and an open position. As is visible, in particular, in FIGS. 8, 9 and 10, the actuation element 6 can be pivoted about a pivot axle 7 supported on the supporting housing 5, between the standby position and the open position, wherein the actuation element 6 is disposed in the open position in FIGS. 2, 6, 7, 9, 10, 12 and 13. For the support of the pivot axle 7, the supporting housing 5 has corresponding bearing points 10, in which the pivot axle is rotatably retained. The actuation element 6 is designed for unlocking and/or opening the rear hatch 2, as shall be explained in greater detail below.

Figure 3:
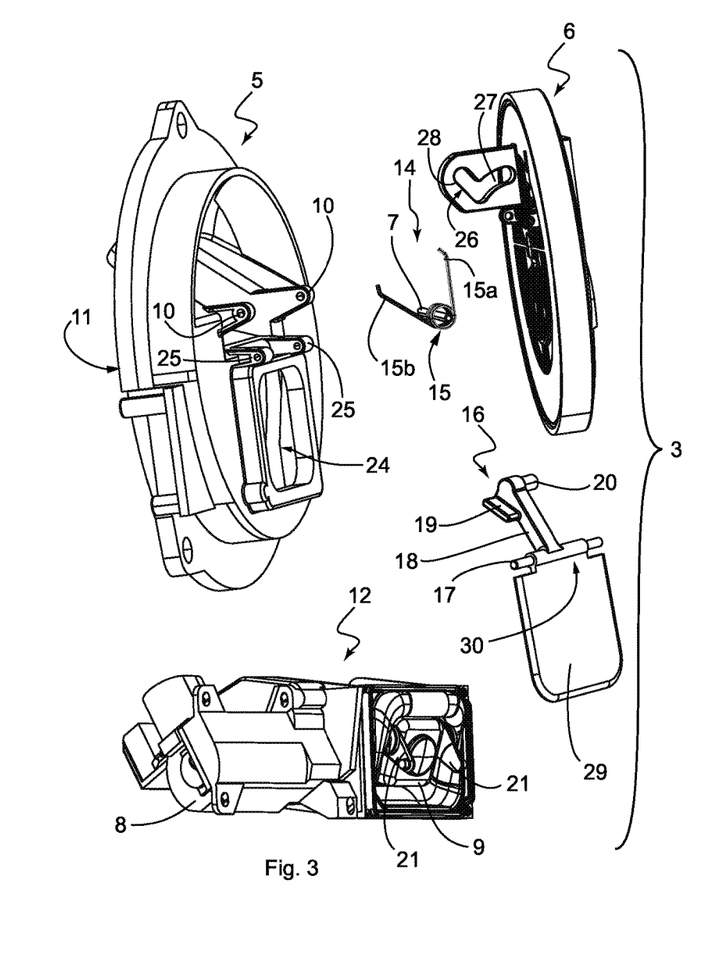
FIG. 3 shows a perspective exploded view of the assembly according to the invention.
Figure 4:
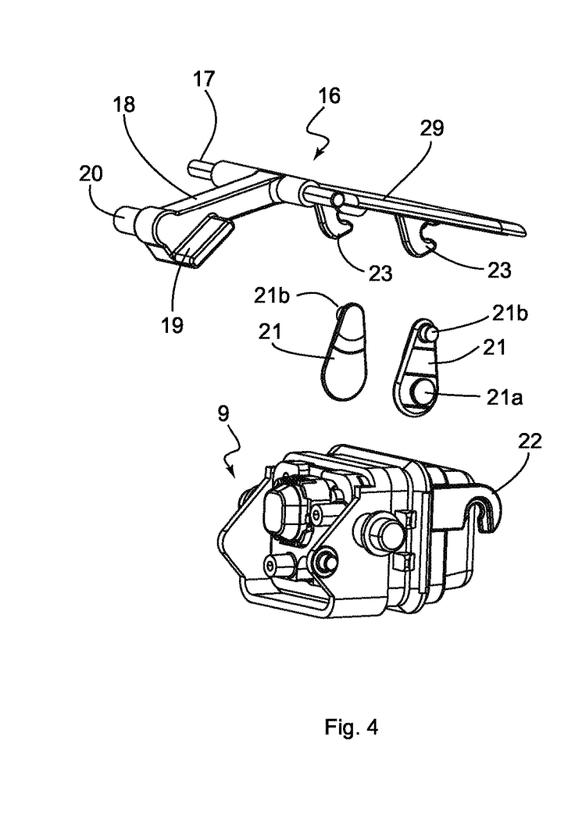
FIG. 4 shows a perspective depiction of a camera unit and a support element of the assembly from FIG. 3.
Figure 5:
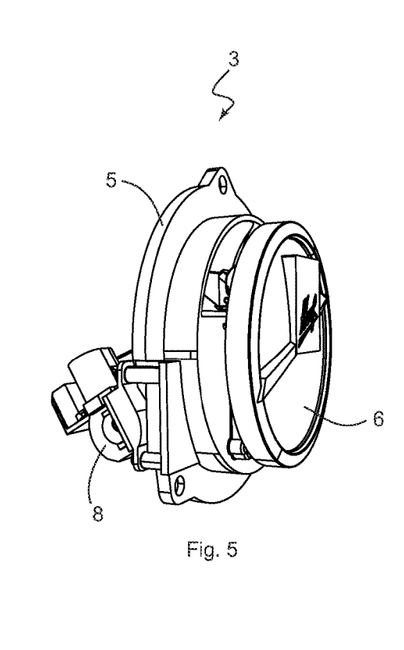
FIG. 5 shows a perspective view of the assembly, in which the actuation element is disposed in a standby position and the camera unit is disposed in a standby position.

As can be seen in FIG. 3, the assembly 3 furthermore comprises a drive unit 8 attached to the supporting housing 5, and a moveably supported camera unit 9, which is accommodated on the supporting housing 5 and coupled to the drive unit 8. The drive unit 8 and the camera unit 9 are designed as a module 12 thereby, which is attached to the back surface 11 of the supporting housing 5. With the aid of the drive unit 8, the camera can move between at least a standby position, shown in FIGS. 5, 6, 8, 9, 11 and 12, and an active position, which can be seen in FIGS. 2, 7, 10 and 13. In the standby position, the camera unit 9 is disposed such that it is retracted into the module 12. In order to move into the active position, the drive unit 8 moves the camera unit 9 out of the module 12, by means of which the camera unit 9 is also moved through the hole 24 formed in the supporting housing 5 (see FIG. 4, for example), in order to record a surrounding area of the vehicle in the active position, as is desired, for example, when driving in reverse in order to park. The actuation element 6 covers the camera unit 9 when in its standby position, as can be clearly seen in FIG. 5.

Figure 6:
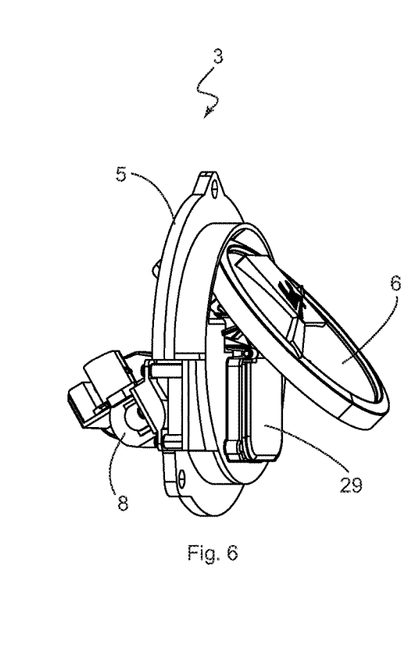
FIG. 6 shows a perspective view of the assembly, in which the actuation element is disposed in an open position and the camera unit is disposed in a standby position.
Figure 12:
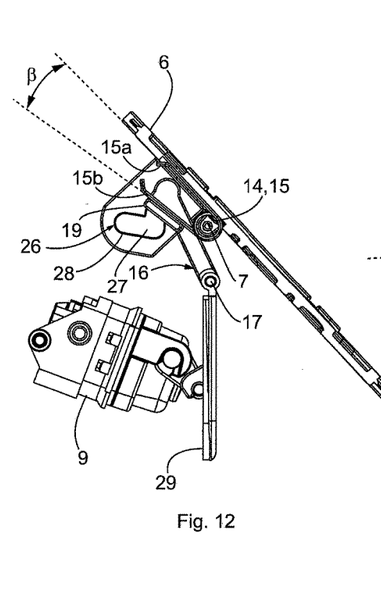
FIG. 12 shows another lateral view of the actuation element, the support element, and the camera unit, wherein the actuation element is disposed in its open position and the camera unit is disposed in its standby position.

The assembly 3 furthermore comprises, according to FIG. 3, a mechanical return element 14, which is designed to retain the actuation element 6 in its standby position (see FIG. 5, for example), in which it covers the camera unit 9, or the module 12, respectively, and prevents a rattling of the actuation element 6, or forces the actuation element 6 into its standby position, when the actuation element 6 is moved by a user into the open position in order to unlock and/or open a door or hatch 2 of the vehicle 1 (see FIG. 6, for example). The mechanical return element 14 is designed as an elastic spring element 15 in the depicted exemplary embodiment. The mechanical return element 14, or the elastic spring element 15, respectively, is coupled to the actuation element 6. More precisely, the spring element 15 is a yoke spring, which can be subjected to bending. The axis of the spring element 15 runs about the pivot axle 7 of the actuation element 6, wherein a first leg 15a of the spring element 15 bears against the actuation element 6, as can be seen in FIG. 12, for example. The mechanical return element 14, or the elastic spring element 15, respectively, is furthermore coupled to a support element 16. More precisely, the second leg 15b of the spring element 15 bears against the support element 16, as is likewise shown in FIG. 12, by way of example. When the two legs 15a and 15b are pressed together, or moved toward one another, the spring element 15 is subjected to a bending, by mean of which the return force generated by the spring element 15 thereby acts on on the actuation element 6.

The support element 16 can be pivoted by means of an axle 17 supported on the supporting housing 5, wherein the support element 16 is designed such that it can be moved, or pivoted, respectively, between an initial position and an operating position. The support for the axle 17 is provided by further bearing points 25 on the supporting housing 5, which bearing points are disposed beneath the bearing points 10 for the pivot axle 7 of the actuation element 6. In the initial position of the support element 16, the camera unit 9 is disposed in the standby position, as is shown in FIGS. 8, 9, 11 and 12, by way of example. Also shown in FIGS. 8 and 11, however, is that the spring element 15 is relaxed, or nearly relaxed, when the support element 16 is in the initial position, and the actuation element 6 is in the standby position, such that an unloaded angle α is formed between the two legs 15a and 15b, which indicates that the spring element 15 is not subjected to a bending, or a pre-tensioning force, which prevents a rattling of the actuation element 6. The unloaded angle α can assume an angle between 50° and 60°, by means of which a certain tolerance range is defined.

Figure 8:
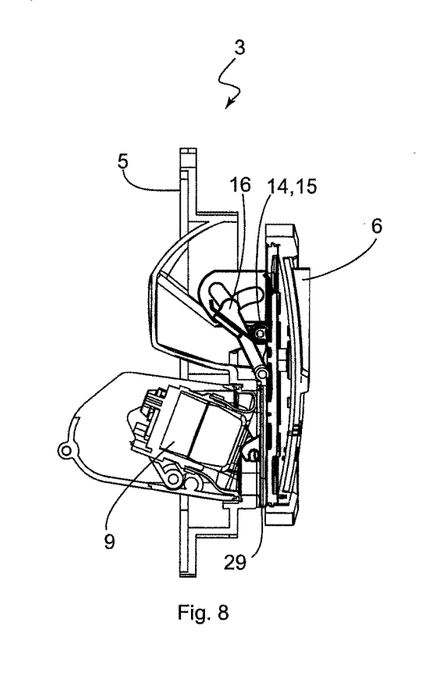
FIG. 8 shows the assembly from FIG. 5 in a lateral sectional view.
Figure 9:
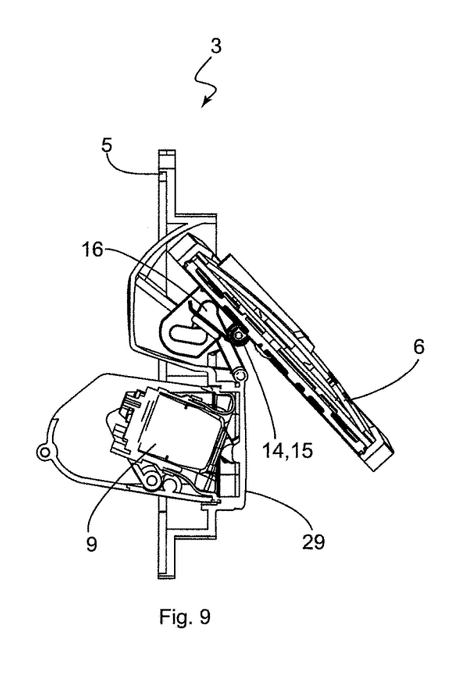
FIG. 9 shows the assembly from FIG. 6 in a lateral sectional view.
Figure 11:
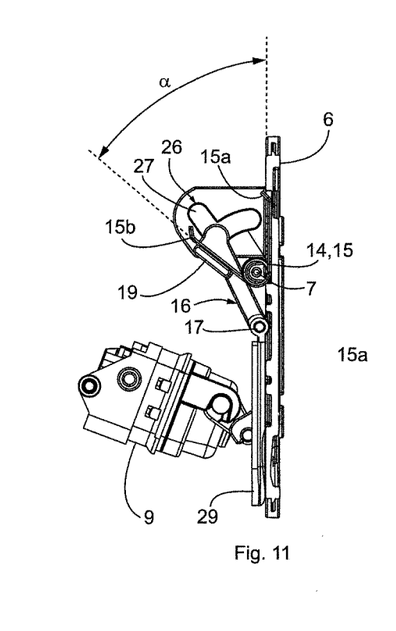
FIG. 11 shows a lateral view of the actuation element, the support element, and the camera unit, wherein the actuation element is disposed in its standby position and the camera unit is disposed in its standby position.

As can be seen in FIGS. 8 and 11, the mechanical return element 15, or the elastic spring element 15, respectively, exerts a return force on the actuation element 6, such that the actuation element 6 is retained in the standby position, or forced therein, when the camera unit 9 is disposed in the standby position and the support element 16 is disposed in the initial position. The return element 14, or the second leg 15b of the spring element, respectively, bears against the support element 16 thereby. In other words, when the camera unit 9 is in the standby position, the mechanical return element 14 exerts a return force on the actuation element 6, that retains the actuation element 6 in the standby position, or forces it into the standby position.

The support element 16 is disposed in its initial position in FIGS. 8, 9, 11 and 12. Regardless of whether the support element 16 is supported on the supporting housing 5 such that it can pivot via the axle 17, the support element 16 is retained in its initial position by a retaining force. The retaining force, which retains the support element 16 in its initial position, is greater than the return force of the elastic spring element 15 thereby. As a result, it is ensured that the actuation element 6 can be moved into the open position, counter to the return force applied by the return element 14, when the camera unit 9 is in its standby position, in order to unlock and/or open the rear hatch 2, as is shown, for example, in FIGS. 6, 9 and 12, in which the actuation element 6 is disposed in the open position. As is also visible in FIGS. 6, 9 and 12, however, a relative movement between the support element 16 held in the initial position and the actuation element 6 occurs as a result of the pivoting of the actuation element 6 form the standby position into the open position, such that the first leg 15a of the spring element 15 is displaced toward the second leg 15b, such that a compression angle β is formed between the two legs 15a and 15b (see FIG. 12, for example), and the elastic spring element 15 is compressed. In other words, the support element 16 is retained in the initial position when the camera element 9 is in the standby position, such that the spring element 15 is elastically compressed as a result of the relative displacement of the actuation element 6 in relation to the support element 16 when the actuation element 6 is in the open position.

The drive unit 8 is coupled to the support element 16, such that the support element 16 can be moved in relation to the supporting housing 5. The positions (initial position or operating position) of the support element 16 are coupled thereby to the positions of the camera unit 9 in the depicted exemplary embodiment. The coupling, or movement coupling, respectively, of the camera unit 9 and the support element 16 can be seen in FIGS. 11 and 13 for the depicted exemplary embodiment, by way of example. Two pivot arms 21 (see FIG. 4, for example), are each provided with two coupling pins 21 and 21b, of which, in each case, a first coupling pin 21a is rotatably accommodated in accommodating arms 22 that are formed on the sides of the camera unit 9, while in contrast, the respective second coupling pin 21b is rotatably accommodated in corresponding pivot arms 23 that are formed on the support element 16. As a result, when the camera unit 9 is in the standby position, the support element 16 is then disposed in the operating position. Because, however, the movement and position of the camera unit 9 are coupled to the drive unit 8, the support element 16 is therefore designed such that it can be moved by means of the drive unit 8 between the initial position and the operating position.

The individual movement paths as well as the relevant mechanical interactions shall be explained in greater detail below. First, however, further structural details of the assembly 3 according to the invention shall be described.

As can furthermore be derived from FIGS. 3, 4 and 8 to 12, the support element 16 has a first lever arm 18. The first lever arm 18 is designed with a bearing surface 19 and a movement pin 20. The bearing surface 19 is designed thereby such that it supports the second leg 15b of the spring element 15, which is then important when the spring element 15 is compressed, or pushed together, when the actuation element 6 is moved into its open position, which requires that the support element 16 is disposed in the initial position and the camera unit is disposed in the standby position. This procedure, in which the return element 14, or the spring element 15, respectively, is compressed, corresponds to the opening procedure described in the prior art for doors or rear hatches with the aid of a known assembly that does not, however, have a camera unit. With this assembly, known from the prior art, the bearing surface 19 formed on the support element 16 is designed as a part of the supporting housing 5, such that the spring element 15 bears against the supporting housing 5 in the customary manner. A relative movement of a support element 16, or a bearing surface 19 formed on the support element 16, respectively, is not provided with this known assembly.

Because the support element 16, with its bearing surface 19, can be moved relation to the supporting housing 5, according to the invention, it is possible that the drive unit 8 then no longer needs to work against the return force of the return element 14, or the spring element 15, respectively, for which reason, the drive unit 8 can be designed with an energy-efficient size. For this reason, the drive unit 8 does not need to work against the return force, because the position of the bearing surface 19 of the first lever arm 18 in relation to the actuation element 6 does not change when the camera unit 9 is moved from the standby position into the active position, as can be seen by a comparison of FIGS. 11 and 13, by way of example. This is because, even when the camera unit 9 is moved from the standby position into the active position, the unloaded angle α is maintained, because the bearing surface 19 of the support element 16 still maintains the same relative position to the actuation element 6. As a result, the spring element 15 is relaxed, both during the movement of the camera unit 9 from the standby position into the active position, as well as in the operating position of the support element 16 and in the open position of the actuation element 6, as is indicated by the unloaded angle α, which can be between 50° and 60°, as specified above (see FIGS. 11 and 13, by way of example).

With the movement of the camera unit 9 from the standby position into the active position, the support element 16 is moved out of the initial position into the operating position. With this movement of the support element 16, the movement pin 20 interacts with a movement path 26 formed on the actuation element 6, as can be seen, by way of example, in FIGS. 10 and 13. The movement path 26 has no significance when the actuation element 6 is moved into the open position, when the support element 16 is disposed in the initial position. This is because the movement pin 20 moves inside a recess 27 when the actuation element 6 is pivoted, but without interacting with the actuation element 6, which however, is not at all desired for an opening or unlocking procedure. The shape and size of the recess 27 are of no significance in an opening or unlocking procedure, as long as the movement pin 20 does not interact with the actuation element 6, or its movement path 26, respectively. The spring element 15 only causes the movement pin 20 to be pressed into the movement path 26 thereby.

Figure 7:
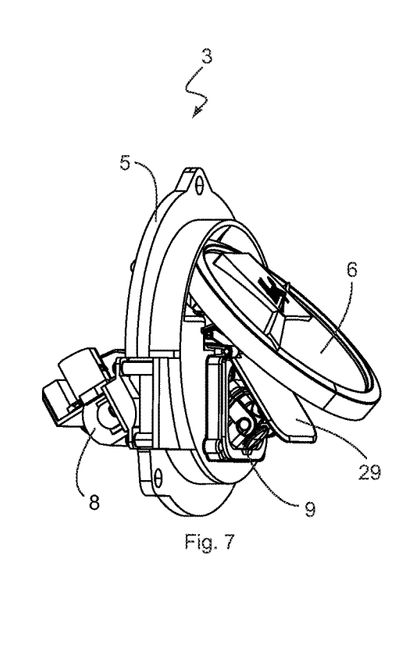
FIG. 7 shows a perspective view of the assembly, in which the actuation element is disposed in an open position and the camera unit is disposed in an active position.
Figure 10:
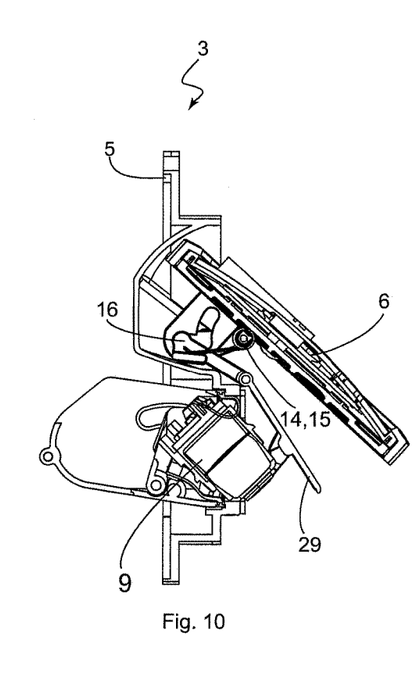
FIG. 10 shows the assembly from FIG. 7 in a lateral sectional view.
Figure 13:
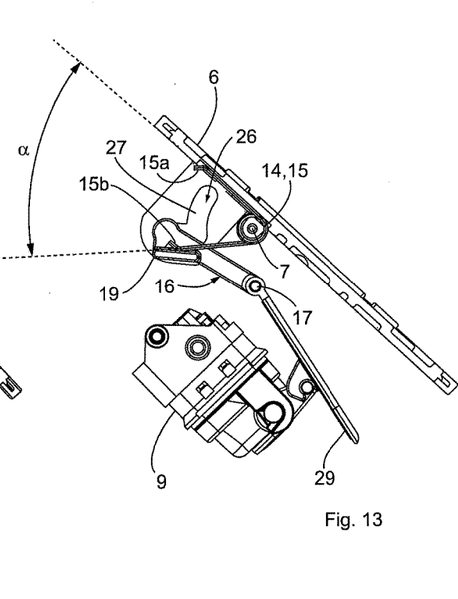
FIG. 13 shows another lateral view of the actuation element, the support element, and the camera unit, wherein the actuation element is disposed in its open position and the camera unit is disposed in its active position.

The movement path 26 first becomes significant when the support element 16 is moved from its initial position into the operating position (see FIGS. 7, 10 and 13). The camera unit 9 is then driven out and used to record the surrounding area of the vehicle 1. For this, however, the actuation element 6 must be moved out of the standby position, in which it covers the camera unit 9, into the open position, for which the movement pin 20 of the support element 16 bears against an end surface 28 of the movement path 26 when moved into the operating position, and as a result, pulls on the actuation element 6. This pulling movement results in the support element 16 pivoting the actuation element 6 into the open position, without having to work against the return force of the return element 14 thereby. Instead, a powerless entrainment of the return element 14 into its open position occurs when the support element 16 is moved into the operating position. With this movement, the unloaded angle α remains between 50° and 60°, such that the movement does not cause a compression of the elastic spring element 15. In other words, the movement pin 20 bears on the end surface 28 (which can also be merely an endpoint), of the movement path 26 of the support element 16 when the support element 16 is moved into the operating position, such that movement pin 20 of the support element 16 pulls the actuation element 6 into its open position, when the support element 16 is moved from the initial position into the operating position, with a force that is less than the return force of the return element. The spring element 15 remains subjected to a pre-tension, in order to prevent a rattling of the actuation element 6.

As is shown in FIGS. 3, 6 and 11 to 13, for example, a flap element 29 is provided, for covering the camera unit 9 when it is disposed in its standby position, but the actuation element 6, however, is in its open position. A second lever arm 30 is formed on the support element 16 in the depicted exemplary embodiment, which represents the flap element 29, and closes the hole 24, in order to protect the camera unit 9. The flap element 29 thus covers the camera unit 9 when the support element 16 is in the initial position. In contrast, the flap element 29 is disposed such that it is pivoted about the axle 17 when the support element 16 is in the operating position, such that the camera unit 9 can be moved into the active position, in order to record a surrounding area of the vehicle 1. The first lever arm 18 and the second lever arm 30 merge at the axle 17, and can be pivoted about said axle.

The pivot arms 23 are formed on the rear surface of the flap element 29 of the support element 16, such that the second lever arm 30 is moveably coupled to the drive unit 8 via the camera unit 9 in the exemplary embodiment shown here. Alternatively, as a matter of course, a coupling can occur via the first lever arm 18, wherein the coupling can occur directly to the drive unit 8, and not via the camera unit 9.

The invention described above is not limited to the described and illustrated exemplary embodiment, as a matter of course. It is clear that numerous obvious modifications can be made to the embodiment depicted in the drawings, which are obvious to the person skilled in the art for the intended use thereof, without abandoning the framework of the invention thereby. Thus, the person skilled in the art will readily realize that, in an alternative design to the illustrated exemplary embodiment, the pivot axle 7 can simultaneously also be the axle 17 that supports the support element 16. Everything contained in the description and/or depicted in the drawings belongs to the invention, including that which is obvious to the person skilled in the art, deviating from the concrete exemplary embodiment.

The invention claimed is:

1. An assembly for a vehicle, in particular for a rear hatch of a vehicle, having a supporting housing, which is to be disposed in an opening of an outer shell of the vehicle, including a drive unit, which is attached to the supporting housing, a moveably supported camera unit, which is accommodated on the supporting housing and coupled to the drive unit, in order to be moved between at least a standby position and an active position, in which a surrounding area of the vehicle can be recorded, an actuation element supported on the supporting housing, which is designed such that it can be moved between a standby position that covers the camera unit and an open position, and which is designed for unlocking and/or opening the rear hatch, a mechanical return element, which is coupled to the actuation element, and a support element, which is coupled to the mechanical return element, wherein the mechanical return element exerts a return force that retains the actuation element in the standby position, or that forces the actuation element into the standby position when the camera unit is in the standby position, and is supported on the support element, wherein the support element can be moved in relation to the supporting housing and wherein the drive unit is coupled to the support element, wherein the support element can be pivoted about an axle supported on the supporting housing and is designed such that it can be moved between an initial position, in which the camera unit is disposed in the standby position, and an operating position, in which the camera unit is disposed in the active position, wherein the support element includes a first lever arm, on which a bearing surface for the mechanical return element is formed, wherein, when the camera unit is moved from the standby position into the active position, the relative position of the bearing surface of the first lever arm in relation to the actuation element does not change, wherein, when the camera unit is moved from the standby position into the active position, the support element moves from the initial position into the operating position and pulls the actuation element into its open position.

2. The assembly according to claim 1, wherein the actuation element can be moved against the return force applied by the return element into the open position when the camera unit is in the standby position, which actuation element is designed for unlocking and/or opening the rear hatch.

3. The assembly according to claim 1, wherein the mechanical return element comprises an elastic spring element.

4. The assembly according to claim 3, wherein the spring element is relaxed or subjected to a pre-tensioning that retains the actuation element in its standby position when the support element is in the initial position and the actuation element is in the standby position.

5. The assembly according to claim 3, wherein the support element is retained in the initial position when the camera unit is in the standby position, such that the spring element is elastically compressed when the actuation element is in the open position as a result of a relative displacement of the actuation element in relation to the support element.

6. The assembly according to claim 5, wherein the support element is pivotably supported on the supporting housing, wherein the support element is retained in the initial position by a retaining force that is greater than the return force of the elastic spring element.

7. The assembly according to claim 3, wherein a movement pin is formed on the first lever arm, wherein the movement pin interacts with a movement path formed on the actuation element.

8. The assembly according to claim 7, wherein the elastic spring element forces the movement pin into the movement path.

9. The assembly according to claim 7, wherein the actuation element can be pivoted about a pivot axle supported on the supporting housing, between the standby position and the open position, wherein, when moved into the operating position, the movement pin bears against an end point or end surface of the movement path of the support element, such that the movement pin of the support element pulls the actuation element in to its open position when the support element is moved from the initial position into the operating position.

10. The assembly according to claim 7, wherein the pivot axle is simultaneously also the axle that supports the support element.

11. The assembly according to claim 7, wherein, when the camera unit is moved from the standby position into the active position, the position of the bearing surface of the first lever arm in relation to the actuation element does not change, such that the spring element is relaxed, or subjected to pre-tension that retains the relative position of the bearing surface to the actuation element, both during the movement of the camera unit from the standby position into the active position, as well as when the support element is in the operating position and the actuation element is in the open position.

12. The assembly according to claim 7, wherein the first lever arm of the support element, or a second lever arm of the support element is moveably coupled to the drive unit.

13. The assembly according to claim 12, wherein the support element is moveably coupled to the drive unit via the camera unit.

14. The assembly according to claim 12, wherein the second lever arm is designed as a flap element, which covers the camera unit when the support element is in the initial position, and which is disposed such that it is pivoted about the axle when the support element is in the operating position, such that the camera unit can be moved into the active position, in order to record a surrounding area of the vehicle.

* * * * *